United States Patent
Kooi

(10) Patent No.: US 11,021,066 B2
(45) Date of Patent: Jun. 1, 2021

(54) VEHICLE COMPRISING A WHEEL DRIVEN GENERATOR FOR CHARGING A BATTERY

(71) Applicant: Carrier Corporation, Jupiter, FL (US)

(72) Inventor: Eeuwe Durk Kooi, Noordwijk (NL)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 15/763,573

(22) PCT Filed: Sep. 23, 2016

(86) PCT No.: PCT/US2016/053436
§ 371 (c)(1),
(2) Date: Mar. 27, 2018

(87) PCT Pub. No.: WO2017/058660
PCT Pub. Date: Apr. 6, 2017

(65) Prior Publication Data
US 2018/0264951 A1 Sep. 20, 2018

(30) Foreign Application Priority Data

Sep. 28, 2015 (NL) ........................................ 2015514
Oct. 8, 2015 (NL) ........................................ 2015587

(51) Int. Cl.
*B60L 7/14* (2006.01)
*B60L 7/10* (2006.01)
(Continued)

(52) U.S. Cl.
CPC .................. *B60L 7/14* (2013.01); *B60H 1/32* (2013.01); *B60K 1/00* (2013.01); *B60L 7/10* (2013.01);
(Continued)

(58) Field of Classification Search
CPC .......... B60L 7/10; B60L 7/22; B60L 15/2045; B60L 50/30; B60L 50/61; B60L 7/14;
(Continued)

(56) References Cited

U.S. PATENT DOCUMENTS

| 5,916,253 A | 6/1999 | Amr et al. |
| 6,441,581 B1 * | 8/2002 | King .................. H02K 7/025 320/101 |

(Continued)

FOREIGN PATENT DOCUMENTS

| CN | 101395030 A | 3/2009 |
| DE | 102012108518 A1 | 3/2014 |

(Continued)

OTHER PUBLICATIONS

International Search Report and Written Opinion for application PCT/US2016/053436, dated Feb. 21, 2017, 11 pages.
(Continued)

*Primary Examiner* — Zachary L Kuhfuss
(74) *Attorney, Agent, or Firm* — Cantor Colburn LLP

(57) ABSTRACT

A vehicle having wheels for riding the vehicle over a carrier such as a road or rails, said vehicle having a battery and a generator connected thereto, said generator being arranged to generate electrical power for charging said battery, said generator being further mechanically connected to at least one of said wheels such that said wheel drives the rotor of said generator, characterized in that said generator is an asynchronous generator or a permanent magnet generator, wherein an AC/DC inverter/charger is connected between said generator and said battery for regulating the current and the voltage of the charging power to said battery.

10 Claims, 1 Drawing Sheet

(51) Int. Cl.
  H02K 7/18    (2006.01)
  H02P 9/48    (2006.01)
  B60L 15/20   (2006.01)
  H02J 7/14    (2006.01)
  B60L 50/90   (2019.01)
  B60L 7/16    (2006.01)
  B60H 1/32    (2006.01)
  B60K 1/00    (2006.01)
  H02K 7/116   (2006.01)
  H02K 11/00   (2016.01)
  H02K 11/04   (2016.01)
  B60L 7/22    (2006.01)

(52) U.S. Cl.
  CPC ............ *B60L 7/16* (2013.01); *B60L 15/2009* (2013.01); *B60L 50/90* (2019.02); *H02J 7/14* (2013.01); *H02K 7/116* (2013.01); *H02K 7/1846* (2013.01); *H02K 11/0094* (2013.01); *H02K 11/046* (2013.01); *H02P 9/48* (2013.01); *B60K 2001/006* (2013.01); *B60L 7/22* (2013.01); *Y02T 10/64* (2013.01); *Y02T 10/72* (2013.01)

(58) Field of Classification Search
  CPC ......... B60L 7/16; Y02T 10/7005; B61C 3/02; B61C 17/06; B60H 1/3232
  USPC .......................................................... 105/35
  See application file for complete search history.

(56) References Cited

U.S. PATENT DOCUMENTS

| | | | | |
|---|---|---|---|---|
| 7,514,803 | B2 * | 4/2009 | Wilks | B60L 53/80 290/1 A |
| 8,776,928 | B2 * | 7/2014 | Stover, Jr. | B60H 1/0045 180/165 |
| 8,789,472 | B2 * | 7/2014 | Mai | B60L 7/10 105/34.1 |
| 9,557,100 | B2 * | 1/2017 | Chopko | F25B 27/00 |
| 2006/0005739 | A1 * | 1/2006 | Kumar | B60L 7/06 105/35 |
| 2007/0204639 | A1 * | 9/2007 | Harrison | B60H 1/3208 62/241 |
| 2007/0272116 | A1 * | 11/2007 | Bartley | B60T 1/10 105/35 |
| 2007/0284165 | A1 * | 12/2007 | Patterson | B60K 1/00 180/165 |
| 2008/0148993 | A1 * | 6/2008 | Mack | B60L 9/00 105/35 |
| 2008/0174174 | A1 * | 7/2008 | Burns | G06F 17/00 303/152 |
| 2008/0289890 | A1 | 11/2008 | Stoltzfus | |
| 2010/0154449 | A1 * | 6/2010 | Stover, Jr. | B60H 1/0045 62/236 |
| 2010/0282122 | A1 * | 11/2010 | Mai | B60L 7/10 105/1.4 |
| 2012/0255798 | A1 | 10/2012 | Palmer | |
| 2013/0134909 | A1 | 5/2013 | Lee | |
| 2014/0020414 | A1 | 1/2014 | Rusignuolo et al. | |
| 2014/0305260 | A1 | 10/2014 | Eriston et al. | |
| 2018/0264951 | A1 * | 9/2018 | Kooi | B60L 50/90 |

FOREIGN PATENT DOCUMENTS

| | | | | |
|---|---|---|---|---|
| EP | 2679459 | A2 | 1/2014 | |
| GB | 2425290 | A * | 10/2006 | ............. B60K 6/105 |
| GB | 2484147 | A | 4/2012 | |
| WO | 2012045056 | A2 | 10/2011 | |
| WO | WO-2012045056 | A2 * | 4/2012 | ............. B60K 25/08 |
| WO | 2012086223 | A1 | 6/2012 | |

OTHER PUBLICATIONS

Chinese Office Action for Application No. 201680056657.7; dated Aug. 22, 2020; 6 Pages.

* cited by examiner

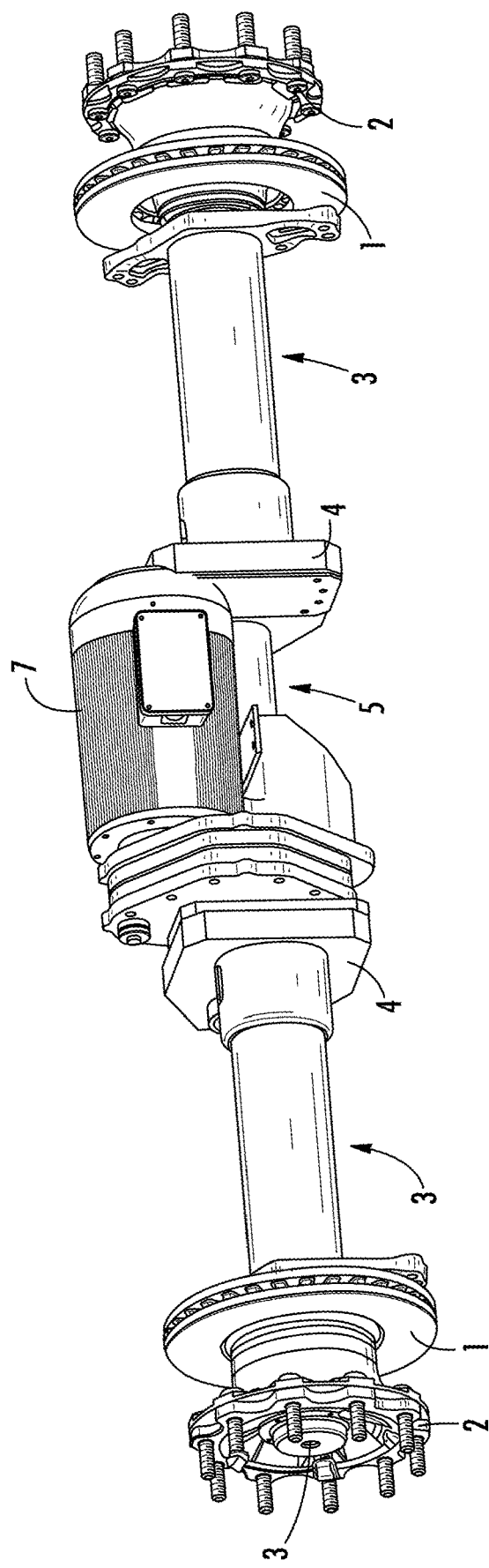

VEHICLE COMPRISING A WHEEL DRIVEN GENERATOR FOR CHARGING A BATTERY

The invention relates to a vehicle having wheels for riding the vehicle over a carrier such as a road or rails, said vehicle having a battery and a generator connected thereto, said generator being arranged to generate electrical power for charging said battery, said generator being further mechanically connected to at least one of said wheels such that said wheel drives the rotor of said generator.

In particular the invention relates to a non-self propelled trailer or railway carriage comprising a refrigerated cargo space. The cargo space has a cooling unit arranged to cool said cargo space to a desired temperature, wherein said cooling unit is powered by the battery. In prior art solutions, in order to provide power to the battery of the refrigerator device of the cargo space, a synchronous type generator is connected to two wheels of the trailer by means of shafts. The windings in the rotor of the generator are powered so as to provide the required magnetic field. A disadvantage of this arrangement is, that at low rotation speeds the current through the windings of the rotor needs to be very high in order to provide a powerful magnetic field, and said high current produces a lot of heat, and thereby also generator failures are caused. Low rotation speeds often occur, in particular because the generator is preferably used while the vehicle is in braking mode (i.e. decelerating), so that the braking energy can be used to charge the battery, and it is desirable to continue using the braking energy for that purpose until the vehicle is at a complete standstill.

The invention aims to solve this problem. To that end, the said generator is an asynchronous generator or a permanent magnet generator, wherein an AC/DC inverter/charger is connected between said generator and said battery for regulating the current and the voltage of the charging power to said battery, so that they are not dependent on the rotation speed of the wheels. Because the rotor in these types of generators do not need to be powered, less heat is produced.

Said battery is preferably a lithium-ion battery. Said mechanical connection between said generator and said wheel preferably comprises a gear box for regulating the rotation speed of said rotor relative to the rotation speed of said wheel. Said at least one wheel preferably drives said rotor of said generator by means of a shaft connected to the centre of said wheel and axially extending therefrom. In an alternative embodiment said at least one wheel drives said rotor of said generator by means of a hydraulic system. Preferably said vehicle comprises a control unit for selectively arranging said generator to simultaneously be driven by said wheel and generate power for charging said battery if said vehicle is set to decelerate.

The invention will further be explained by means of a preferred embodiment, with reference to the FIGURE, wherein a perspective view of a wheel, shaft and generator arrangement for a trailer or a railway carriage is shown.

The FIGURE shows two respective coaxial wheel attachment flanges 2 and brake disks 1 of a trailer which are rotatably mounted in wheel bearings of the trailer (not shown). A wheel shaft 3 is connected to the wheel mounted on the flange 2 and extends axially from the centre of the flange 2 towards the area between the wheels. In the area between the wheels, the wheel shafts 3 are each connected to a respective gear box 4, which each comprises gear wheels to transfer the rotation of the wheel shafts 3 to a central shaft, such that the rotation speed of the central shaft is increased compared to the rotation speed of the wheel shafts 3.

The central shaft is connected to a gear box 5, the other end of which is connected to the rotor shaft of a asynchronous generator 7, which gear box 5 can selectively be set to increase the rotation speed of the rotor. The electrical output connectors of the generator 7 are connected to an AC/DC inverter/charger for regulating the output current and voltage, which in turn is connected to a lithium-ion battery pack for powering a refrigerating device for cooling a cargo space of the trailer (not shown). In an alternative embodiment (not shown) the central shaft drives a hydraulic drive system, which drives said rotor shaft of the generator 7.

The invention has thus been described by means of a preferred embodiment. It is to be understood, however, that this disclosure is merely illustrative. Various details of the structure and function were presented, but changes made therein, to the full extent extended by the general meaning of the terms in which the appended claims are expressed, are understood to be within the principle of the present invention. The description and drawing shall be used to interpret the claims. The claims should not be interpreted as meaning that the extent of the protection sought is to be understood as that defined by the strict, literal meaning of the wording used in the claims, the description and drawing being employed only for the purpose of resolving an ambiguity found in the claims. For the purpose of determining the extent of protection sought by the claims, due account shall be taken of any element which is equivalent to an element specified therein.

The invention claimed is:

1. A vehicle having wheels for riding the vehicle over a carrier such as a road or rails, said vehicle having a battery and a generator connected thereto, said generator being arranged to generate electrical power for charging said battery, said generator being further mechanically connected to a first wheel of the wheels such that said first wheel drives a rotor of said generator, wherein said generator is an asynchronous generator or a permanent magnet generator, wherein an AC/DC inverter/charger is connected between said generator and said battery for regulating the current and the voltage of the charging power to said battery, wherein said mechanical connection between said generator and said first wheel comprises;
a first gear box including gear wheels configured to transfer rotation of said first wheel to a central shaft;
a second gear box configured to transfer rotation of said central shaft to said rotor;
the first gear box and the second gear box configured to regulate a rotation speed of said rotor relative to the rotation speed of said first wheel, wherein said vehicle is a non-self propelled trailer or railway carriage.

2. A vehicle in accordance with claim 1, wherein said generator is an asynchronous generator.

3. A vehicle in accordance with claim 1, wherein said generator is a permanent magnet generator.

4. A vehicle in accordance with claim 1, wherein said battery is a lithium-ion battery.

5. A vehicle in accordance with claim 1, wherein said first wheel drives said rotor of said generator by means of a shaft connected to the center of said first wheel and axially extending therefrom.

6. A vehicle in accordance with claim 1, wherein said vehicle comprises a control unit for selectively arranging said generator to simultaneously be driven by said first wheel and generate power for charging said battery if said vehicle is set to decelerate.

7. A vehicle in accordance with claim 1, wherein said vehicle comprises a cargo space with a cooling unit arranged to cool said cargo space to a desired temperature, wherein said cooling unit is powered by said battery.

8. A vehicle in accordance with claim 1, further comprising:
   a second wheel of the wheels;
   a third gear box including gear wheels configured to transfer rotation of said second wheel to the central shaft.

9. A vehicle in accordance with claim 8, wherein the first and third gear boxes are positioned on opposite ends of the generator and the second gearbox is located between the first and third gear boxes.

10. A vehicle in accordance with claim 9, wherein the second gearbox is located beneath the generator.

* * * * *